US012780256B2

(12) United States Patent
Laurense et al.

(10) Patent No.: US 12,780,256 B2
(45) Date of Patent: Nov. 3, 2026

(54) TRAJECTORY SELECTION IN RESPONSE TO TRIGGERING EVENTS

(71) Applicant: Zoox, Inc., Foster City, CA (US)

(72) Inventors: Vincent Andreas Laurense, Foster City, CA (US); Glenn Xavier Liem, San Francisco, CA (US); Joseph Funke, Redwood City, CA (US); Varun Agrawal, Mountain View, CA (US); Jiayin Xia, Santa Clara, CA (US)

(73) Assignee: Zoox, Inc., Foster City, CA (US)

( * ) Notice: Subject to any disclaimer, the term of this patent is extended or adjusted under 35 U.S.C. 154(b) by 97 days.

(21) Appl. No.: 18/345,963

(22) Filed: Jun. 30, 2023

(65) Prior Publication Data

US 2025/0002047 A1 Jan. 2, 2025

(51) Int. Cl.
*B60W 60/00* (2020.01)
*B60W 50/02* (2012.01)

(52) U.S. Cl.
CPC .... *B60W 60/0018* (2020.02); *B60W 50/0205* (2013.01)

(58) Field of Classification Search
CPC ......... B60W 60/0018; B60W 50/0205; B60W 30/09; B60W 50/029; B60W 2050/0292; B60W 2050/0297; B60W 50/038; B60W 50/082; B60W 50/023; B60W 60/0015;
(Continued)

(56) References Cited

U.S. PATENT DOCUMENTS 9,365,213 B2 * 6/2016 Stenneth ............. B60W 30/182
9,551,992 B1 * 1/2017 Barton-Sweeney .. B60W 10/04
9,632,502 B1 * 4/2017 Levinson ................. G06N 7/01
(Continued)

FOREIGN PATENT DOCUMENTS

DE 102019113876 A1 * 1/2020 ........ B60W 50/0098
DE 102019115330 A1 * 12/2020 ........ B60W 60/0053
(Continued)

OTHER PUBLICATIONS

JP-2022166112-A machine translation (Year: 2022).*
(Continued)

*Primary Examiner* — Fadey S. Jabr
*Assistant Examiner* — Mark Robert Heim
(74) *Attorney, Agent, or Firm* — Lee & Hayes, P.C.

(57) ABSTRACT

Techniques for optimal trajectory generation for a vehicle are described herein. In some cases, the techniques described herein include determining a first primary trajectory by a first component (e.g., a planner component) of the vehicle, determining a triggering event associated with the first primary trajectory by a second component (e.g., a trajectory validation component) of the vehicle, controlling the vehicle based on an alternative trajectory (e.g., a trajectory configured to cause the vehicle to stop and/or slow down) in response to the triggering event, determining a second primary trajectory by the first component and based at least in part on a state of the vehicle along the alternative trajectory, and one or more of: (i) controlling the vehicle based on the alternative trajectory if the triggering event is still present, or (ii) controlling the vehicle based on the second primary trajectory if the triggering event is no longer present.

13 Claims, 6 Drawing Sheets

(58) Field of Classification Search
CPC ........................ B60W 60/0011; G05D 1/0214; G05D 1/0212
See application file for complete search history.

(56) References Cited

U.S. PATENT DOCUMENTS 9,720,415 B2 * 8/2017 Levinson ............. G05D 1/0257
9,740,202 B2 * 8/2017 Barton-Sweeney ......................... B60W 60/00253
9,910,441 B2 * 3/2018 Levinson .......... B60W 60/0027
10,133,275 B1 * 11/2018 Kobilarov ......... B60W 60/0016
10,782,141 B2 * 9/2020 Noda ................. G06Q 10/0637
11,022,974 B2 * 6/2021 Levinson ............. G05D 1/0276
11,099,563 B2 * 8/2021 Darayan .................. G05D 1/81
11,673,565 B1 * 6/2023 Dingli ................... B60W 50/14 701/29.2
11,945,434 B2 * 4/2024 Tao ................. B60W 30/18159
2011/0246156 A1 * 10/2011 Zecha .................... G06V 40/23 703/6
2016/0133064 A1 * 5/2016 Patino ................. B60W 50/045 701/29.1
2017/0090480 A1 * 3/2017 Ho ........................ B60W 30/00
2019/0056735 A1 * 2/2019 Koopman ........... B60W 50/023
2019/0138000 A1 * 5/2019 Hammond ........ B60W 50/0205
2020/0148201 A1 * 5/2020 King ...................... G06N 20/00
2020/0174481 A1 * 6/2020 Van Heukelom .. G01C 21/3407
2020/0189573 A1 * 6/2020 King ................... B60R 21/0134
2020/0201324 A1 * 6/2020 Darayan .............. G05D 1/0238
2020/0211394 A1 * 7/2020 King ................... B60W 50/023
2021/0004010 A1 * 1/2021 Pan ........................ G08G 1/167
2021/0026359 A1 * 1/2021 MacGregor ..... B60W 60/00186
2021/0046923 A1 * 2/2021 Olson ................. B60W 30/095
2021/0046926 A1 * 2/2021 Olson ................. B60W 50/029
2021/0053558 A1 * 2/2021 Costa .................... B60W 30/09
2021/0094538 A1 * 4/2021 Beller .................... B60W 40/04
2021/0096566 A1 * 4/2021 Wang ................ B60W 30/0953
2021/0139050 A1 * 5/2021 Fujita .................... B60W 50/04
2021/0163021 A1 * 6/2021 Frazzoli .................. H04W 4/48
2021/0271251 A1 * 9/2021 Hudecek ............ B60W 60/0011
2021/0286651 A1 * 9/2021 Ho ......................... G06F 3/0647
2021/0300360 A1 * 9/2021 Sasin ..................... B60Q 1/525
2021/0370921 A1 * 12/2021 Silva ................. B60W 60/0027
2021/0405642 A1 * 12/2021 Danford ............ B60W 60/0027
2022/0236737 A1 * 7/2022 Narang .................. G06N 3/045
2022/0266862 A1 * 8/2022 Bybee ................... B60W 10/20
2022/0308233 A1 * 9/2022 Yoo ........................ G06V 20/58
2023/0132512 A1 * 5/2023 Clawson ........... B60W 60/0027 701/26
2023/0202469 A1 * 6/2023 Jiang ................. B60W 50/0097 701/301
2023/0391369 A1 * 12/2023 Jang ....................... B60Q 9/008
2024/0101121 A1 * 3/2024 Jing .................. B60W 50/0097
2024/0112580 A1 * 4/2024 Kimata .................. G08G 1/164
2024/0124060 A1 * 4/2024 Giordano .......... B60W 30/0953
2024/0326792 A1 * 10/2024 Puphal .............. B60W 60/0027
2024/0383473 A1 * 11/2024 Kim .................. B60W 30/0956
2025/0083666 A1 * 3/2025 Do .................... B60W 50/0098
2025/0128740 A1 * 4/2025 Nakayama ............... G08G 1/16

FOREIGN PATENT DOCUMENTS

EP 3279851 A1 * 2/2018 ......... G01C 21/3461
EP 4151489 A1 * 3/2023 ........ B60W 50/0225
JP 2015230547 A * 12/2015
JP 2022166112 A * 11/2022
KR 20230075413 A * 5/2023
WO WO-2023028437 A1 * 3/2023 ............. G06N 3/006

OTHER PUBLICATIONS

KR-20230075413-A machine translation (Year: 2023).*
JP-2015230547-A machine translation (Year: 2015).*
DE-102019113876-A1 machine translation (Year: 2020).*
DE-102019115330-A1 machine translation (Year: 2020).*
Search Report and Written Opinion for International Application No. PCT/US2024/035806, Dated Oct. 21, 2024.

* cited by examiner

TRAJECTORY SELECTION IN RESPONSE TO TRIGGERING EVENTS

BACKGROUND

Safety of passengers in a vehicle and other people or objects in proximity to the vehicle is of the upmost importance. Such safety is often predicated on an accurate detection of a potential triggering event and timely deployment of a safety measure. However, on occasion, such events may resolve during deployment of the safety measure. As such, the system may not operate as effectively as desired, which may result in unsafe or undesired behavior.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
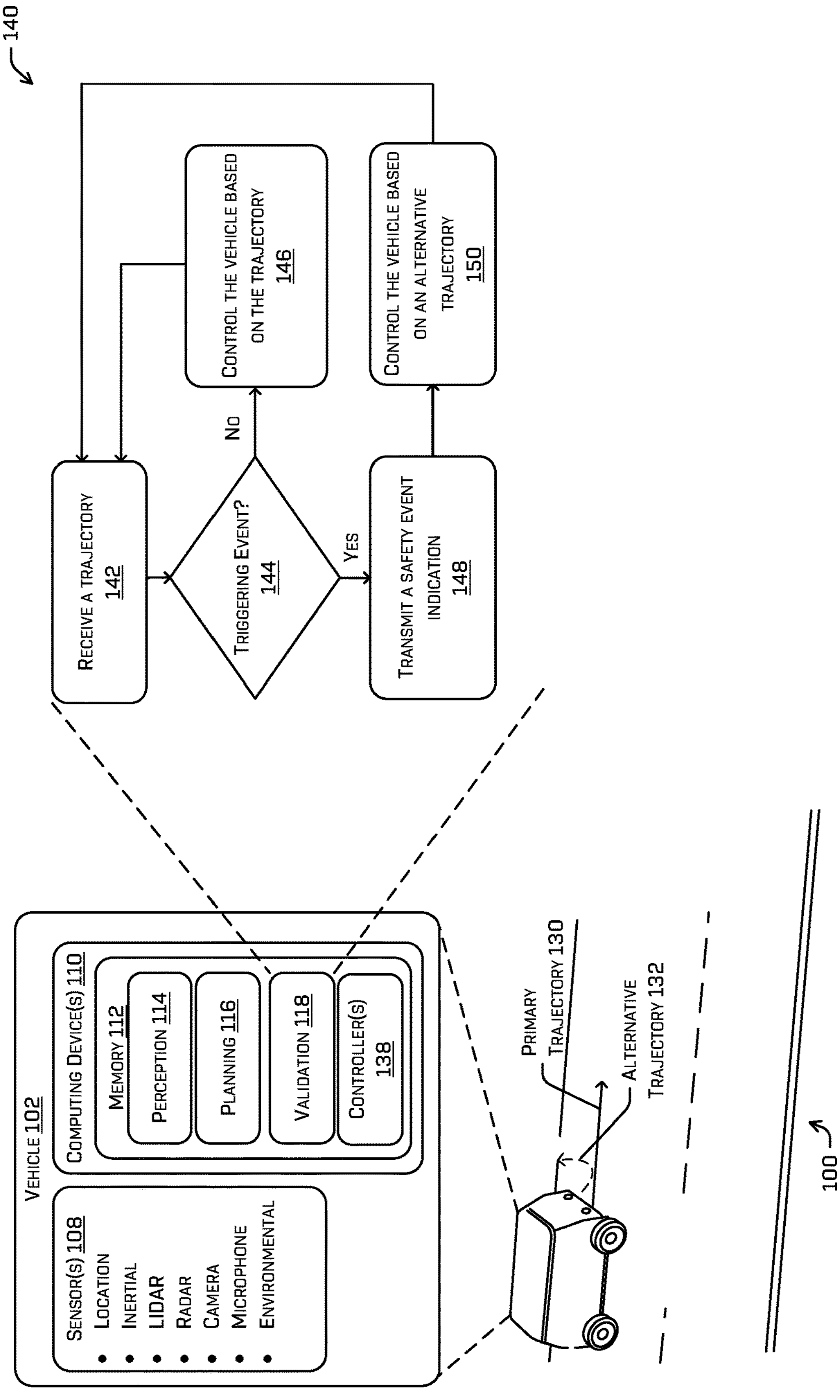
FIG. 1 illustrates an example environment in which the techniques described herein may be implemented.

Techniques for optimal trajectory generation for a vehicle are described herein. In some cases, the techniques described herein include determining a first primary trajectory by a first component (e.g., a planner component) of the vehicle, determining a triggering event associated with the first primary trajectory by a second component (e.g., a trajectory validation component, component validation, etc.) of the vehicle, controlling the vehicle based on an alternative trajectory (e.g., a trajectory configured to cause the vehicle to stop and/or slow down) in response to the triggering event, transmitting an indication of the triggering event to the first component, determining a second primary trajectory by the first component and based at least in part on a state of the vehicle along the alternative trajectory, and one or more of: (i) controlling the vehicle based on the alternative trajectory if the triggering event is still present, or (ii) controlling the vehicle based on the second primary trajectory if the triggering event is no longer present.

Accordingly, in some cases, the techniques described herein select a controlling trajectory for a vehicle based on presence or absence of a triggering event associated with the vehicle. In some cases, while the triggering event is present, the vehicle is controlled based on an alternative trajectory that is configured to cause the vehicle to stop, slow down, and/or limit other behaviors. However, in the absence of the triggering event (e.g., after the trajectory validation component "releases" the triggering event), the vehicle is controlled based on a primary trajectory. A primary trajectory may be a trajectory that is determined by the first component (e.g., a planner component) of the vehicle and provided to the second component (e.g., a trajectory validation component) of the vehicle. In some cases, when the first component determines a primary trajectory in the absence of a triggering event, the determined primary trajectory is referred to as a nominal trajectory. A nominal trajectory may be determined based on a determined state of the vehicle along a previous primary trajectory used to control the vehicle. In some cases, when the first component determines a primary trajectory while a triggering event is present, the determined primary trajectory is referred to as a recovery trajectory. A recovery trajectory may be determined based on a determined state of the vehicle along the alternative trajectory used to control the vehicle.

In some cases, these techniques described herein can be employed to improve the safety of a vehicle. The techniques may accomplish this objective by making sure that, once the second component detects that a safety issue is present, the vehicle is controlled in accordance with an alternative trajectory at least until the second component detects absence of the safety issue. In some cases, the second component detects the presence of the safety issue based on determining that a first condition is satisfied and the absence of the safety issue based on determining that a different second condition is satisfied. In some cases, the second condition is stricter than the first condition. For example, the first condition may be satisfied when a probability of failure associated with the vehicle is above to a first threshold while the second condition may be satisfied when the probability of failure falls below or is equal to a second threshold that is lower than the threshold. In this example, if the probability of failure falls between the two thresholds, the second component may continue to operate the vehicle based on the alternative trajectory, even though the condition that triggered detecting the triggering event is no longer present. The objective behind this differential thresholding may be to make it harder to resume normal operations of the vehicle after detecting a triggering event, thus ensuring a higher level of safety for the vehicle in response to detecting a triggering event.

As the examples provided above illustrate, in some cases, described techniques may be used to select or otherwise determine to use an optimal trajectory for the vehicle to increase the likelihood that the vehicle is operated safely (e.g., in compliance with relevant traffic regulations, without collision with other objects in the vehicle environment, and/or the like). Accordingly, the techniques discussed herein may improve the safety of occupants of a vehicle that incorporates the techniques discussed herein. Moreover, the techniques may improve the efficiency of vehicle, such as a vehicle, in accomplishing a mission such as delivering passengers and/or cargo, surveying a region, or the like.

In some cases, the techniques described include equipping the vehicle with two separate components (e.g., implemented using two separate computing systems) each configured to generate and/or validate a trajectory for the vehicle: a first component and a second component. In some cases, the vehicle may include a vehicle safety system implemented separately from the vehicle computing device for improved performance of the vehicle safety system, and/or to provide redundancy, error checking, and/or validation of determinations and/or commands determined by the vehicle computing device. However, in other cases, the vehicle safety system may be implemented as one or more components within the same vehicle computing device. Additional examples of a vehicle architecture comprising a first component and a second component can be found, for example, in U.S. patent application Ser. No. 16/218,182 titled "Collision Avoidance System with Trajectory Validation" filed Dec. 12, 2018, U.S. patent application Ser. No. 16/218,182 titled "Collision Avoidance System" filed Dec. 26, 2018, and U.S. patent application Ser. No. 16/588,529 titled "Collision Avoidance Perception System" filed Sep. 30, 2019, the entirety of which are herein incorporated by reference. Example techniques for operation of the first component are described in U.S. Pat. No. 9,910,441, titled "Adaptive Autonomous Vehicle Planner Logic," filed on Nov. 4, 2015, which is incorporated by reference.

The first component may generally perform processing to control how the vehicle maneuvers within an environment. The first component may implement various Artificial Intelligence (AI) techniques, such as machine learning, to understand an environment around the vehicle and/or instruct the vehicle to move within the environment. For example, the first component may implement various techniques (including machine learning, search and optimization algorithms, etc.) to localize the vehicle, detect an object around the vehicle, segment sensor data, determine a classification of the object, predict an object track, generate a trajectory for the vehicle, and so on. In one example, the first component generates a primary trajectory for controlling the vehicle and an alternative trajectory for controlling the vehicle, and provides the primary trajectory and the alternative trajectory to the second component. The alternative trajectory may control the vehicle to come to a stop and/or to perform another maneuver (e.g., swerve to one side, lane change, etc.). In some cases, the first computing device is configured to determine that the first trajectory and the second trajectory are both free from collision prior to transmitting them to the second computing device.

The second component may generally evaluate the first component using at least a subset of data (e.g., sensor data that may in include a portion and up to all data) made available to the first component. The second component may also independently detect an object around the vehicle and/or predict a trajectory for the object. The second component may use the pose of the vehicle and/or the predicted trajectory for the object to evaluate a trajectory of the vehicle provided by the first component and determine if the trajectory should be used to control the vehicle. Such localizations and/or detections may use similar techniques as used in the first component so as to verify the outputs thereof and/or use dissimilar techniques to ensure consistency and verifiability of such outputs.

To evaluate a trajectory of the vehicle, the second component may perform one or more operations to evaluate (or validate) the trajectory. For example, the second component may check to see if a trajectory was generated less than a threshold amount of time ago, if the trajectory is consistent with a current or previous pose of the vehicle (e.g., the trajectory controls the vehicle to be positioned at a location that is possible given the current pose of the vehicle), if the trajectory is compatible with a capability of the vehicle (e.g., steering limits, acceleration limits, etc.), and so on. Further, the second component may check to see if a trajectory is associated with a collision. For example, the second component may check to see if a trajectory of the vehicle provided by the first component intersects with a trajectory of an object determined by the second component and if the object and the vehicle meet at the intersection at the same time (or a window of time). That is, the second component may determine if the vehicle would collide with an object if the vehicle were maintained along the trajectory provided by the first component. Such collision checking may be based on either one or more of direct kinematic assumptions of travel and/or predictions of motion as determined by one or more additional techniques. As another example, the second component may check to determine whether one or more systems and/or subsystems associated with the vehicle are functioning properly (e.g., check to see whether the vehicle's sensors are functioning properly, whether mechanical systems like engine, brakes, transmission are in good condition, whether the onboard computer systems are functioning properly, and/or the like).

In some cases, relative to the second component, the first component is expected to have a higher predictive accuracy but a lower predictive frequency and/or responsiveness. This may be because the first component analyzes a larger set of sensory input data, uses more computationally complex processing operations, and/or uses more predictive models—each of which is a factor that may increase the predictive accuracy of trajectory evaluation outputs generated by the first component but may also cause the first component to be higher than the second component. In some cases, because the first component generates more predictively accurate trajectory evaluation outputs but does so at a slower pace, the second component is expected to be less accurate but more responsive than the first component. Accordingly, in some cases, the second component is used to validate operations of the first component.

In some cases, the techniques described herein include determining that a triggering event is present in relation to the vehicle. In some cases, the vehicle is associated with a set of defined safety conditions. In some cases, an example system determines that a triggering event is present when the system detects that at least a threshold number of (e.g., at least one of) of the defined safety conditions are satisfied. Examples of defined safety conditions include: (i) a safety condition that is satisfied if a likelihood that the vehicle is unable to proceed safely is above a threshold, (ii) a safety condition that is satisfied if a defined segment of the vehicle (e.g., a set of one or more subsystems and/or one or more components of the vehicle) fails to operate reliably, (iii) a safety condition that is satisfied if the second component of the vehicle fails to receive a trajectory from the first component of the vehicle for a threshold time period, (iv) a safety condition that is satisfied if a likelihood that a latest trajectory used to control the vehicle is unsafe is above a threshold, and (v) a safety condition that is satisfied if the time passed since starting to control the vehicle based on an alternative trajectory is less than a threshold time period.

In some cases, the second component of the vehicle may compute a failure likelihood that represents a likelihood that the vehicle is unable to proceed safely. To compute the failure likelihood, the second component may use at least one of: (i) data representing a likelihood that a trajectory used to control the vehicle is safe (e.g., is validated, avoids collision, and/or the like), (ii) data representing whether a defined segment of the vehicle (e.g., a set of one or more subsystems and/or one or more components of the vehicle) fails to operate reliably, (iii) data representing whether the second component has received a trajectory from the first component within a recent time period having a defined length (e.g., within the time period associated with one iteration and/or "tick" associated with a planner component of the vehicle, or (iv) data representing the length of time passed since starting to control the vehicle based on an alternative trajectory. Accordingly, in some cases, the failure likelihood may be a holistic measure of the operational reliability and effectiveness of various components of the vehicle.

For example, in some cases, the vehicle may be associated with one or more "critical" segments, where detecting the failure of at least one critical segment may cause the failure likelihood to have a predefined high and/or maximal value (e.g., a value of one). A critical segment may be a combination of one or more components and/or one or more subsystems of the vehicle. For example, in some cases, the second component of a vehicle may determine a maximal value for the failure likelihood if at least one of the following segments of the vehicle is detected to experience failure: (i) the perception component, (ii) the planner component, (iii) the prediction component, (iv) the control component, (v) mechanical components such as the braking system, or (v) other systems and/or subsystems designated as being critical to the vehicle. As another example, in some cases, the second component of a vehicle may determine a maximal value for the failure likelihood if at least one critical sensor (e.g., a lidar sensor, a radar sensor, and/or the like) of the vehicle is detected to experience a failure (e.g., a failure to capture data, a failure to capture data accurately, and/or the like). In some cases, a critical segment of a vehicle may be a system that is not located on-vehicle, such as a server device that interacts with the vehicle's computing device and/or a data reporting system (e.g., a Global Positioning System (GPS) system).

As another example, in some cases, the failure likelihood may be computed based on a trajectory failure likelihood that a controlling trajectory of the vehicle is safe. For example, in some cases, after the first component determines a trajectory, the second component computes the trajectory failure likelihood before and/or during the period in which the vehicle is controlled using the determined trajectory. In some cases, if the trajectory failure likelihood of the determined trajectory exceeds a threshold at any point before or during the period associated with control of the vehicle using the trajectory, the second component may transition to controlling the trajectory based on an alternative trajectory. The alternative trajectory may be a trajectory that is configured to cause the vehicle to stop and/or slow down. In some cases, the alternative trajectory may be a trajectory that is expected to cause the vehicle to stop operating and/or transition to operating in a safe mode. In some cases, the alternative trajectory may be a trajectory that is configured to cause the vehicle to transition to a manual navigation mode in which a driver is alerted to control the vehicle.

As an additional example, in some cases, the failure likelihood may be set to a predefined high and/or maximal value (e.g., a value of one) if the time that has passed since starting to control the vehicle based on an alternative trajectory is less than a threshold. In some cases, after the second component determines that a triggering event is present, the second component controls the vehicle based on the alternative trajectory. In some cases, before the second component adopts a new trajectory provided by the first component, the second component should ensure and/or determine that is likely that the first component has detected that the vehicle is being controlled using the alternative trajectory (e.g., not using a trajectory provided by the first component). One mechanism for accomplishing this objective may be to ensure that, if less than a threshold time period has passed since starting to control the vehicle using the alternative trajectory, the failure likelihood associated with the vehicle is set to a predefined high and/or maximal value. The threshold time period may be defined, for example, based on the time period associated with one iteration and/or "tick" associated with the first component. In some cases, by setting the threshold time period to be at least as long as the time period associated with one iteration and/or "tick" associated with the first component, the techniques described herein increase the likelihood and/or ensure that the first component detects control of the vehicle using the alternative trajectory and thus determines any trajectories based on a state of the vehicle along the alternative trajectory.

As a further example, in some cases, the failure likelihood may be set to a predefined high and/or maximal value (e.g., a value of one) if the second component does not receive a trajectory from the first component during a defined recent period. In some cases, the first component is configured to periodically and/or iteratively provide a new trajectory to the second component. In some cases, if an excessively long time has passed since receiving a trajectory from the first component (e.g., as defined based on a threshold time period), the second component determines that the previously-received trajectory may no longer be reliable and thus reverts to controlling the vehicle in accordance with the alternative trajectory. In some cases, the length of the recent period is determined based at least in part on the time period associated with one iteration and/or "tick" associated with the first component. In some cases, by determining the failure likelihood based on the length of time since receiving a trajectory from the first component, the techniques described herein account for the time-sensitivity of trajectory updates and acknowledge that a delay in receiving a fresh trajectory may compromise the vehicle's ability to navigate safely.

In some cases, the failure likelihood may be determined using conditional logic. The conditional logic may be characterized by one or more Boolean conditions and one or more non-Boolean values (e.g., one or more continuous values, such as one or more likelihood and/or probability values). For example, the Boolean conditions may include: (i) a condition representing whether no critical segment associated with the vehicle is detected to experience failure, (ii) a condition representing whether a trajectory has been received from the first component during a defined recent period, and/or (iii) a condition representing whether a threshold time has passed since starting to control the vehicle using the alternative trajectory. The non-Boolean values may include a trajectory failure likelihood associated with a trajectory used to control the vehicle. In some cases, the failure likelihood is determined using a conditional logic representing that: (i) if all of the Boolean conditions associated with the vehicle are satisfied, determining the failure likelihood based on the non-Boolean values, and (ii) if at least one of the Boolean conditions associated with the vehicle is not satisfied, setting the failure likelihood to a predefined high and/or maximal value.

For example, in some cases, the failure likelihood may be determined using the following conditional logic: (i) if no critical segment of the vehicle is detected to experience failure, the failure likelihood is determined based on a likelihood that a trajectory used to control the vehicle is unsafe, (ii) if at least one critical segment of the vehicle is detected to experience failure, the failure likelihood is set to a predefined high and/or maximal value (e.g., a value of one). In this example, even after the end of any failures associated with the critical conditions of the vehicle, the failure likelihood may remain low and cause a transition to an alternative trajectory if the controlling trajectory is determined to be unsafe.

As another example, in some cases, the failure likelihood may be determined using the following conditional logic: (i) if no critical segment of the vehicle is detected to experience failure and a trajectory has been received from the first component in the defined recent period, the failure likelihood is determined based on a likelihood that a trajectory used to control the vehicle is safe, (ii) if either at least one critical segment of the vehicle is detected to experience failure, or a trajectory has not been received from the first component in the defined recent period, or both, the failure likelihood is set to a predefined high and/or maximal value (e.g., a value of one). In this example, even after the end of any failures associated with the critical conditions of the vehicle and given timely receipt of a new trajectory from the first component, the failure likelihood may remain low and cause a transition to an alternative trajectory if the controlling trajectory is determined to be unsafe.

In some cases, the techniques described herein include transmitting an indication of a triggering event to the first component of the vehicle. In some cases, the second component determines that the triggering event is present and/or transmits the triggering event indication to the first component. In some cases, the triggering event indication comprises an indication that the vehicle is being controlled in accordance with an alternative trajectory. In some cases, one objective behind transmitting the triggering event indication to the first component is to cause the first component to determine a trajectory (e.g., a recovery trajectory) based on a state of the vehicle along the alternative trajectory. In some cases, the triggering event indication contains data representing the alternative trajectory.

In some cases, after receiving the triggering event indication, the first component becomes aware of the deviation from any previously-provided trajectories and the use of a new trajectory. In some cases, by transmitting the triggering event indication to the first component, the system enables a coordinated response between the two components. This approach may ensure that the first component is informed of the triggering event and can adjust its trajectory planning accordingly, taking into account the state of the vehicle along the alternative trajectory. This collaborative effort allows for a smooth transition from the alternative trajectory, enhancing the overall safety and efficiency of the vehicle's operation.

In some cases, the triggering event indication contains data representing the safety conditions that triggered detection of the triggering event. For example, the triggering event indication may describe that the triggering event was triggered because of a failure of a particular vehicle component and/or because the trajectory failure likelihood associated with controlling trajectory of the vehicle is above the threshold. In some cases, the transmission of safety condition data to the first component facilitates a comprehensive assessment of the vehicle's overall state and condition by the first component. For example, the first component may gain insights into the specific safety condition that triggered the adoption of the alternative trajectory. This information allows the first component to evaluate the nature and severity of the triggering event and make informed decisions about trajectory generation in light of those evaluations. For example, based on detecting that the vehicle is operating in an icy road environment, the first component may adjust the vehicle trajectory to slow down and avoid steep slopes. Additionally, the transmission of the safety condition data can enable the first component to consider contextual factors in generating a recovery trajectory. For example, if the data suggests heavy traffic ahead, the first component may develop a trajectory that prioritizes safety over speed to plot a course that maintains a safe distance from other vehicles while navigating the traffic. The state of the vehicle along the alternative trajectory provides valuable information about its position, velocity, orientation, and other relevant parameters. By leveraging this contextual data, the first component can calculate a recovery trajectory that is tailored to the specific conditions and/or constraints posed by the alternative trajectory.

In some cases, the techniques described herein include determining a recovery trajectory based on a state (e.g., a detected state, a reported state, a predicted state, and/or the like) of the vehicle along an alternative trajectory. In some cases, based on (e.g., in response to) receiving a triggering event indication, the first component determines a state of the vehicle along the alternative trajectory and uses the determined state to determine the recovery trajectory. The recovery trajectory may thus be a trajectory determined by the first component based on a state of the vehicle along the alternative trajectory.

In some cases, to determine the state of the vehicle along the trajectory, the first component uses at least one of the following: (i) data (e.g., perception data) determined based on sensor data captured by one or more sensors associated with the vehicle, (ii) data determined based on performing one or more predictive inferences regarding expected behavior of one or more objects (e.g., vehicles, pedestrians, and/or the like) in the vehicle environment, and/or (iii) data representing the behaviors associated with the alternative trajectory. For example, in some cases, the second component determines a detected state (e.g., a detected position) of the vehicle at a first time based on the sensor data, determines to use the alternative trajectory at the first time, and predicts an expected state of the vehicle at a second time based on the detected state and the alternative trajectory. To determine the alternative trajectory, the second component may use data provided by the second component (e.g., using the triggering event indication), data representing a predefined alternative trajectory (e.g., a predefined trajectory of immediate stop, a predefined trajectory of slowing down by a predefined magnitude and/or a predefined ratio, a predefined trajectory causing the vehicle to move to the nearest shoulder, and/or the like), and/or data representing an expected alternative trajectory given the expected behavior of one or more objects (e.g., vehicles, pedestrians, and/or the like) in the vehicle environment.

In some cases, before receiving a triggering event indication, the first component operates in a "nominal mode." In some cases, during the nominal mode, the first component periodically and/or iteratively determines a nominal trajectory and transmits the nominal trajectory to the second component. In some cases, while operating in the nominal mode, the first component determines a nominal trajectory based on a state of the vehicle along a previously-transmitted nominal trajectory. Accordingly, in some cases, while in the nominal mode, the first component generates nominal trajectories assuming that the previously-provided nominal trajectories are being used to control the vehicle.

In some cases, after receiving a triggering event indication, the first component operates in a "recovery mode." In some cases, during the first iteration of its operation while in the recovery mode, the first component determines an initial recovery trajectory based on a state of the vehicle along an alternative trajectory and transmits the initial recovery trajectory. Accordingly, in some cases, while in the first iteration after entering the recovery mode, the first component generates an initial recovery trajectory assuming that the vehicle is being controlled using the alternative trajectory.

In some cases, during a subsequent iteration of its operation while in the recovery mode after the first iteration, the first component determines whether the second component has provided an indication that the previously-provided recovery trajectory is rejected. If the second component has provided an indication that the previously-provided recovery trajectory is rejected, the first component determines a new recovery trajectory based on an updated state of the vehicle along the alternative trajectory. However, if the second component has not provided an indication that the previously-provided recovery trajectory is rejected, the first component determines a new nominal trajectory and/or returns to a nominal mode. Accordingly, in some cases, if the second component fails to reject a recovery trajectory before a subsequent iteration of the operation of the first component, the first component assumes that the recovery trajectory has been used to control the vehicle and determines a new nominal trajectory based on a state of the vehicle along the previous recovery trajectory.

Accordingly, in some cases, during an Nth iteration of the first component's operation while in a recovery mode, where N>1: (i) if the recovery trajectory provided in the (N−1)th iteration has been rejected, the second component generates a recovery trajectory for the current Nth iteration based on a state of the vehicle along the alternative trajectory, (ii) if the recovery trajectory provided in the (N−1)th iteration has not been rejected, the second component generates a new nominal trajectory for the current Nth iteration based on a state of the vehicle along the recovery trajectory provided in the (N−1)th iteration. In some cases, during the recovery mode, if the first component receives an indication of the absence of the triggering event, the first component switches to the nominal mode.

The techniques described herein include determining the absence (e.g., the end) of a previously-detected triggering event. In some cases, the second component determines the absence of the triggering event. In some cases, determining the absence of a previously-detected triggering event is distinct from detecting that no triggering events are present during a nominal operational mode. For example, the second component may detect the presence of a triggering event based on detecting a first condition, but afterward may detect the absence of the previously-detected safety based on detecting a different second condition. In some cases, the second condition is stricter than the first condition.

For example, in some cases, the second component may determine the presence of a triggering event if a failure likelihood exceeds a first threshold and the absence of that triggering event if the failure likelihood falls below or is equal to a second threshold. In some cases, the second threshold may be lower than the first threshold. As described above, one objective behind this differential thresholding may be to make it harder to resume normal operations of the vehicle after detecting a triggering event, thus ensuring a higher level of safety for the vehicle in response to detecting a triggering event.

In some cases, the second component may determine the absence of a previously-detected triggering event based on determining at least one of the following: (i) that the failure likelihood falls below or is equal to a threshold, (ii) that no critical segment of the vehicle is experiencing failure, (iii) that a trajectory has been received from the first component within a defined time period, or (iv) that a threshold period of time has passed since starting to operate the vehicle using an alternative trajectory. For example, in some cases, after determining the presence of the previously-detected triggering event, the second component starts to control the vehicle using the alternative trajectory. In some cases, after a threshold period of time has passed since starting to control the vehicle using the alternative trajectory (e.g., assuming no other safety condition is detected), the second component determines the absence of the previously-detected safe event.

In some cases, after the second component determines the absence of a triggering event, the second component transmits an indication of the absence of the triggering event to the first component. The indication may, for example, represent that a recovery trajectory provided by the first component has been used to control the vehicle (e.g., has been validated and/or accepted). In some cases, the indication of the absence of the triggering event causes the first component to transition to a nominal mode. In some cases, during the first iteration after entering the nominal mode, the second component determines a nominal trajectory based on a state of the vehicle along the recovery trajectory used to control the vehicle. In some cases, during a subsequent iteration after the first iteration, the second component determines a nominal trajectory based on a state of the vehicle along a nominal trajectory provided in a previous iteration.

In some cases, an example system generates a recovery trajectory by using a state along the alternative trajectory as an initial state of the vehicle and determining an optimal trajectory from that initial state to a second desired state. One approach that may be employed by the system involves a tree-based rollout to generate the trajectory. In some cases, the system expands a search tree starting from the initial state, considering various actions and their potential outcomes at each branching point. The system evaluates different trajectories and estimates their potential success in reaching the desired state. By iteratively expanding and evaluating the tree, the system identifies the most promising trajectory as the recovery trajectory.

In some cases, the techniques and/or systems discussed herein may enhance safety of passengers in a vehicle and/or other individuals in proximity to the vehicle. For example, a second component may detect a triggering event associated with a trajectory provided by a first component and control a vehicle to safely decelerate, stop, and/or perform another maneuver to avoid a collision. In some cases, the second component may operate relatively independently from the first component, so that another form of evaluation occurs to avoid a collision. For instance, the second component may independently detect an object in proximity to the vehicle and/or evaluate a trajectory generated by the first component. Further, in some cases, the second component may be a higher integrity (e.g., more verifiable) and/or less complex system than the first component. For instance, the second component may be designed to process less data, include a shorter processing pipeline than the first component, operate according to techniques that are more easily verifiable than the techniques of the first component, and so on.

In some cases, the techniques described herein increase the redundancy of a vehicle computing device by equipping the device with two components for trajectory validation. In some cases, if one of those components fails, the other can take over, which increases the reliability of the vehicle computing device. This redundancy approach provides an additional layer of safety and continuity in the trajectory validation process. If a safety condition is detected or if a trajectory needs to be verified, both trajectory validation components work in parallel to independently assess and validate the trajectory. This simultaneous validation process increases the system's confidence in the accuracy and reliability of the trajectory, as any discrepancies or inconsistencies between the two components can be detected and resolved. Moreover, in the event of a failure in one of the components, the remaining component can continue performing trajectory validation without interruption, ensuring the vehicle's operations remain secure and unaffected by the failure.

The methods, apparatuses, and systems described herein may be implemented in a number of ways. Example implementations are provided below with reference to the following figures. Although discussed in the context of an autonomous vehicle, in some examples, the methods, apparatuses, and systems described herein may be applied to a variety of systems. In another example, the methods, apparatuses, and systems may be utilized in an aviation or nautical context. Additionally, or alternatively, the techniques described herein may be used with real data (e.g., captured using sensor(s)), simulated data (e.g., generated by a simulator), or any combination thereof.

FIG. 1 illustrates an example environment 100 in which the techniques described herein may be implemented. As depicted in FIG. 1, the environment 100 includes a vehicle 102. As further depicted in FIG. 1, the vehicle 102 is associated with a primary trajectory 130 and an alternative trajectory 132.

The primary trajectory 130 and the alternative trajectory 132 may be generated using one or more sensors 108 and/or one or more computing devices 110 of the vehicle. According to the techniques discussed herein, data gathered by the vehicle(s) 102 may include sensor data from sensor(s) 108 of the vehicle(s) 102. For example, the sensor(s) 108 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a camera), an audio sensor (e.g., a microphone), and/or environmental sensor (e.g., a barometer, a hygrometer, etc.). The sensor(s) 108 may generate sensor data, which may be received by computing device(s) 110 associated with the vehicle(s) 102. However, in other examples, some or all of the sensor(s) 108 and/or computing device(s) 110 may be separate from and/or disposed remotely from the vehicle(s) 102 and data capture, processing, commands, and/or controls may be communicated to/from the vehicle(s) 102 by one or more remote computing devices via wired and/or wireless networks.

Computing device(s) 110 may comprise a memory 112 storing a perception component 114, a planning component 116, one or more controller 138, and/or a trajectory validation system 118. Note that, in some examples, the computing device(s) 110 may additionally or alternatively store a localization component, which may comprise software and/or hardware system(s) for determining a pose (e.g., position and/or orientation) of the vehicle(s) 102 relative to one or more coordinate frames (e.g., relative to the environment, relative to a roadway, relative to an inertial direction of movement associated with the autonomous vehicle). The localization component may output at least part of this data to the perception component 114, which may output at least some of the localization data and/or use the localization data as a reference for determining at least some of the perception data.

The perception component 114 may determine what is in the environment surrounding the vehicle(s) 102 (or during a simulation what is in the simulated environment) and the planning component 116 may determine how to operate the vehicle(s) 102 according to information received from the localization component and/or the perception component 114. The localization component, the perception component 114, and/or the planning component 116 may include one or more machine-learned (ML) models and/or other computer-executable instructions.

In some cases, the planning component 116 is configured to generate one or more trajectories (e.g., the primary trajectory 130, an alternative trajectory 132, and/or the like). The trajectory validation system 118 may be configured to validate a trajectory provided by the planning component 116, select an optimal trajectory, and provide the optimal trajectory to the system controller(s) 138. The system controller(s) 138 may then be configured to control the vehicle 102 based on the selected trajectory.

In some cases, to select an optimal trajectory, the trajectory validation system 118 performs the operations of the process 140, as depicted in FIG. 1. However, while various implementations described herein describing validating and selecting trajectories using the trajectory validation system 118, a person of ordinary skill in the relevant technology will recognize that other components of a vehicle may also be used to validate and select trajectories. Moreover, all of the operations described herein as being performed by the trajectory validation system 118 can be performed by other components of a vehicle.

As depicted in FIG. 1, at operation 142, the trajectory validation system 118 receives a primary trajectory from the planning component 116. The primary trajectory may be a trajectory determined by the planning component based on a state of the vehicle 102 along the trajectory that is being used to control the vehicle 102. In some cases, when the operation 142 is being performed while the planning component 116 is operating in a nominal mode, the primary trajectory is determined based on a state of the vehicle 102 along a primary trajectory (e.g., a nominal trajectory or a recovery trajectory) that is previously provided to the trajectory validation system 118 by the planning component 116. In some cases, when the operation 142 is being performed while the planning component is operating in a recovery mode, the primary trajectory is determined based on a state of the vehicle along at least one of the alternative trajectory or a recovery trajectory that is previously provided to the trajectory validation system 118 by the planning component 116.

For example, in some cases, during the first iteration after the planning component 116 enters the recovery mode, the primary trajectory is a recovery trajectory that is determined based on a state of the vehicle along the alternative trajectory. As another example, in some cases, during a subsequent iteration after the planning component 116 enters the recovery mode, if a previously-provided recovery trajectory is rejected by the trajectory validation system 118, the primary trajectory is a recovery trajectory that is determined based on a state of the vehicle along the alternative trajectory. As an additional example, in some cases, during a subsequent iteration after the planning component 116 enters the recovery mode, if a previously-provided recovery trajectory is not rejected by the trajectory validation system 118, the primary trajectory is a recovery trajectory that is determined based on a state of the vehicle along the previously-provided recovery trajectory.

At operation 144, the trajectory validation system 118 determines whether a triggering event is present. In some cases, the trajectory validation system 118 determines that a triggering event is present based on determining that a failure likelihood associated with the vehicle 102 exceeds a threshold. In some cases, the trajectory validation system 118 determines that a triggering event is not present based on determining that a failure likelihood associated with the vehicle 102 falls below or is equal to a threshold.

In some cases, determining whether a triggering event is present at operation 144 is based in part on whether the trajectory validation system 118 has previously determined that a triggering event is present (e.g., based on whether the planning component 116 is in the nominal mode or in the recovery mode). In some cases, if the trajectory validation system 118 has previously determined that a triggering event is not present (e.g., if the planning component is in the nominal mode), the triggering event is determined to be present unless the failure likelihood associated with the vehicle 102 exceeds a first threshold. In some cases, if the trajectory validation system 118 has previously determined that a triggering event is present (e.g., if the planning component is in the recovery mode), the triggering event is determined to be present unless the failure likelihood associated with the vehicle 102 falls below or is equal to a second threshold that is lower than the first threshold. In some cases, if the trajectory validation system 118 has previously determined that a triggering event is not present (e.g., if the planning component is in the nominal mode), the triggering event is determined to be present unless a first condition is satisfied. In some cases, if the trajectory validation system 118 has previously determined that a triggering event is present (e.g., if the planning component is in the recovery mode), the triggering event is determined to be present unless the failure likelihood associated with the vehicle 102 unless a second condition that is stricter than the first condition is satisfied.

In some cases, the triggering event is determined based on at least one of a failure likelihood associated with the vehicle 102, a trajectory failure likelihood associated with a trajectory used to control the vehicle 102 (e.g., a previously-received nominal or recovery trajectory), or whether a defined segment of the vehicle (e.g., a set of one or more subsystems and/or one or more components of the vehicle) fails to operate reliably. In some cases, if the vehicle 102 is being controlled using an alternative trajectory, the triggering event is determined based on whether the time passed since starting to control the vehicle based on an alternative trajectory is less than a threshold time period. The threshold time period may be defined, for example, based on the time period associated with one iteration and/or "tick" associated with the first component.

At operation 146, based on (e.g., in response to) detecting absence of a triggering event, the trajectory validation system 118 controls the vehicle based on the primary trajectory received at operation 142. In some cases, operation 146 is performed based on detecting absence of a triggering event and based on validating the primary trajectory received at operation 142. In some cases (e.g., assuming no triggering event is determined between receiving two primary trajectories, after performing operation 146, the trajectory validation system 118 returns to operation 142 to receive a new primary trajectory from the planning component 116. In some cases, when the process 140 returns to operation 142 after performing operation 146, the trajectory received at operation 142 is a nominal trajectory.

At operation 148, based on (e.g., in response to) detecting presence of a triggering event, the trajectory validation system 118 transmits a triggering event indication to the planning component 116. The triggering event indication may represent that the trajectory validation system 118 has determined the presence of a triggering event and/or that the trajectory validation system 118 controls the vehicle 102 based on an alternative trajectory. The triggering event condition may cause the planning component 116 to determine a recovery trajectory based on a state of the vehicle 102 along the alternative trajectory.

At operation 150, the trajectory validation system 118 controls the vehicle 102 based on the alternative trajectory. The alternative trajectory may be configured to cause the vehicle to slow down (e.g., by a predefined amount and/or at a predefined rate), stop, and/or move to the nearest shoulder of the road. In some cases, after performing operation 150, the trajectory validation system 118 returns to operation 142 to receive a new primary trajectory from the planning component 116. In some cases, when the process 140 returns to operation 142 after performing operation 150, the trajectory received at operation 142 is a recovery trajectory.

Figure 2:
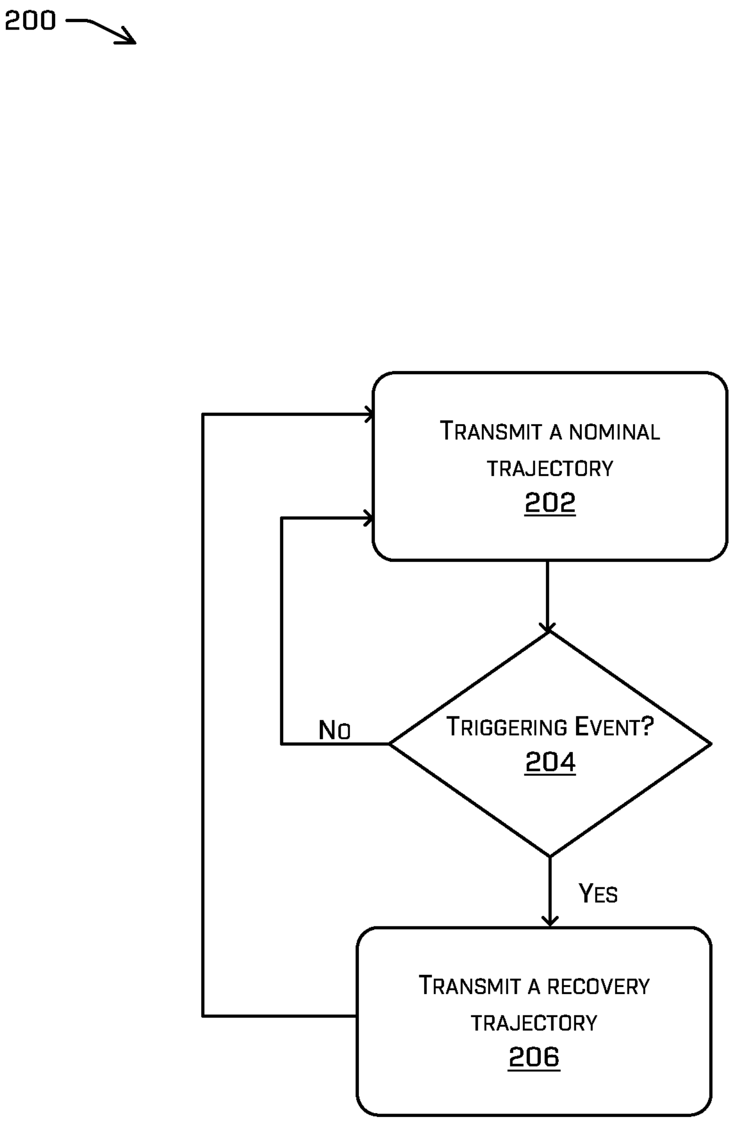
FIG. 2 is a flowchart diagram of an example process that may be performed by a planning component.

FIG. 2 is a flowchart diagram of an example process 200 that may be performed by a planning component (e.g., the planning component 116 of FIG. 1). As depicted in FIG. 1, at operation 202, the planning component determines and transmits a nominal trajectory to a second component (e.g., a trajectory validation system, such as the trajectory validation system 118 of FIG. 1). The nominal trajectory may be determined based on a primary trajectory that is used to control the vehicle. In some cases, at operation 202, the planning component is operating in a nominal mode.

At operation 204, the planning component determines whether the second component has determined the presence of a triggering event (e.g., a safety event). For example, the planning component may determine the presence or absence of the triggering event based on whether a failure likelihood exceeds a first threshold. As another example, the planning component the presence or absence of the triggering event based on whether at least one safety condition is satisfied under the present conditions of the vehicle. In some cases, based on determining the absence of a triggering event at operation 204, the process 200 returns to operation 202 to generate and transmit a new nominal trajectory. In some cases, based on determining the absence of a triggering event at operation 204, the planning component remains in the nominal mode.

At operation 206, based on determining the presence of the triggering event at operation 204, the planning component transmits a recovery trajectory to the second component. The recovery trajectory may be generated based on a state of the vehicle along an alternative trajectory used to control the vehicle. In some cases, at operation 206, the planning component is operating in a recovery mode. In some cases, after transmitting the recovery trajectory, the planning component returns to operation 202 (e.g., to operate in a nominal mode).

Figure 3:
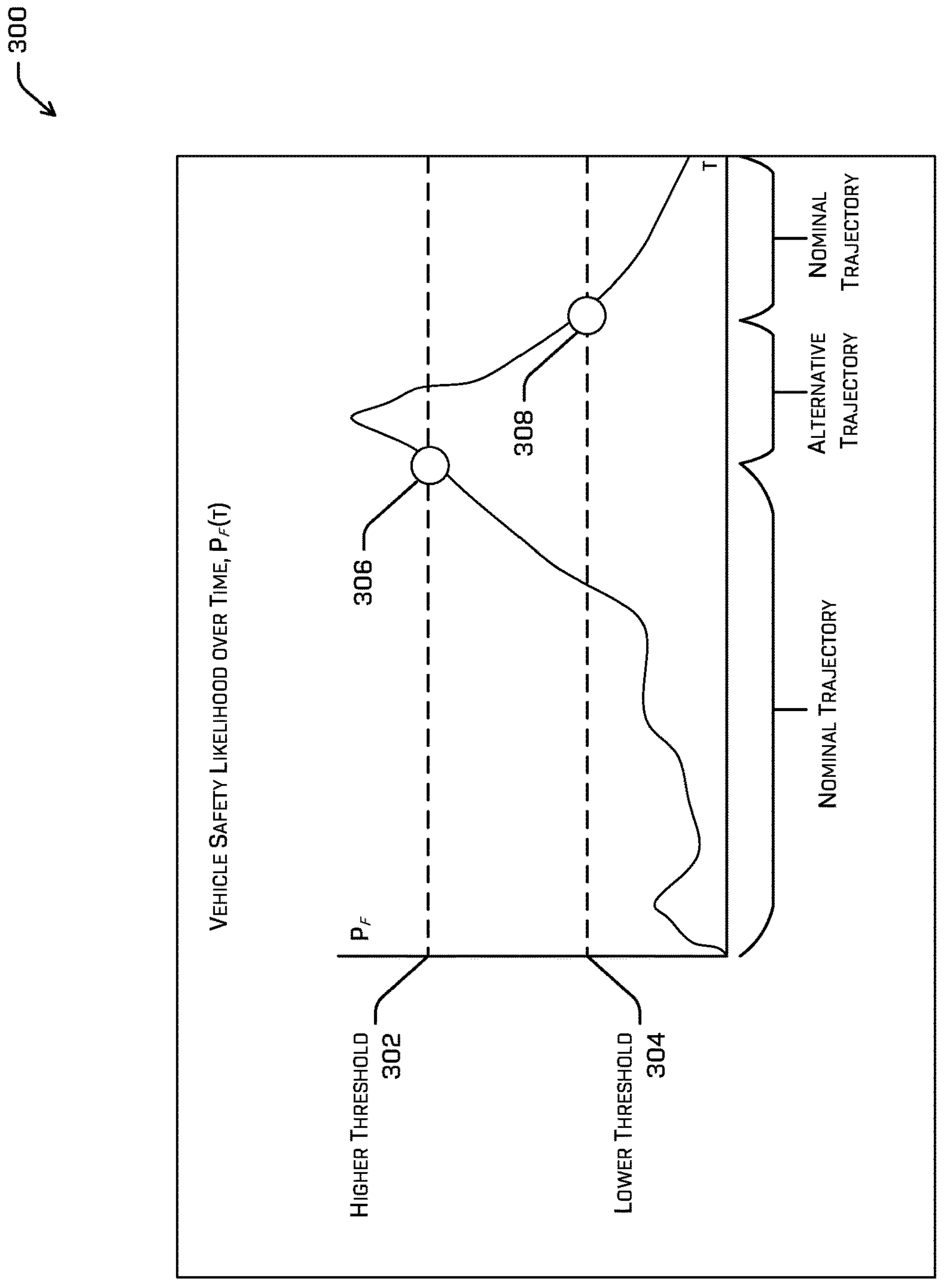
FIG. 3 provides an operational example determining the presence of a triggering event followed by determining the absence of the detected triggering event.

FIG. 3 provides an operational example 300 of determining the presence of a triggering event followed by determining the absence of the detected triggering event. As depicted in FIG. 3, the operational example 300 includes applying a likelihood model that represents a failure likelihood over time to an event model characterized by two hyper-parameters: a higher threshold 302 and a lower threshold 304. The higher threshold 302 may be associated with determining the presence of a triggering event while the lower threshold 304 may be associated with determining the absence of a previously-detected triggering event.

As depicted in FIG. 3, in some cases, the time associated with the first intersection with the higher threshold 302 (e.g., the time associated with the point 306) is the beginning of the period associated with the presence of the triggering event. Moreover, in some cases, the time associated with the first intersection with the higher threshold 302 following the triggering event detection (e.g., the time associated with the point 308) is the end of the period associated with the presence of the triggering event. Accordingly, in FIG. 3, the detected triggering event is present between the time associated with the point 306 and the time associated with the point 308, even though during part of that period the failure likelihood is below the higher threshold 302.

Figure 4:
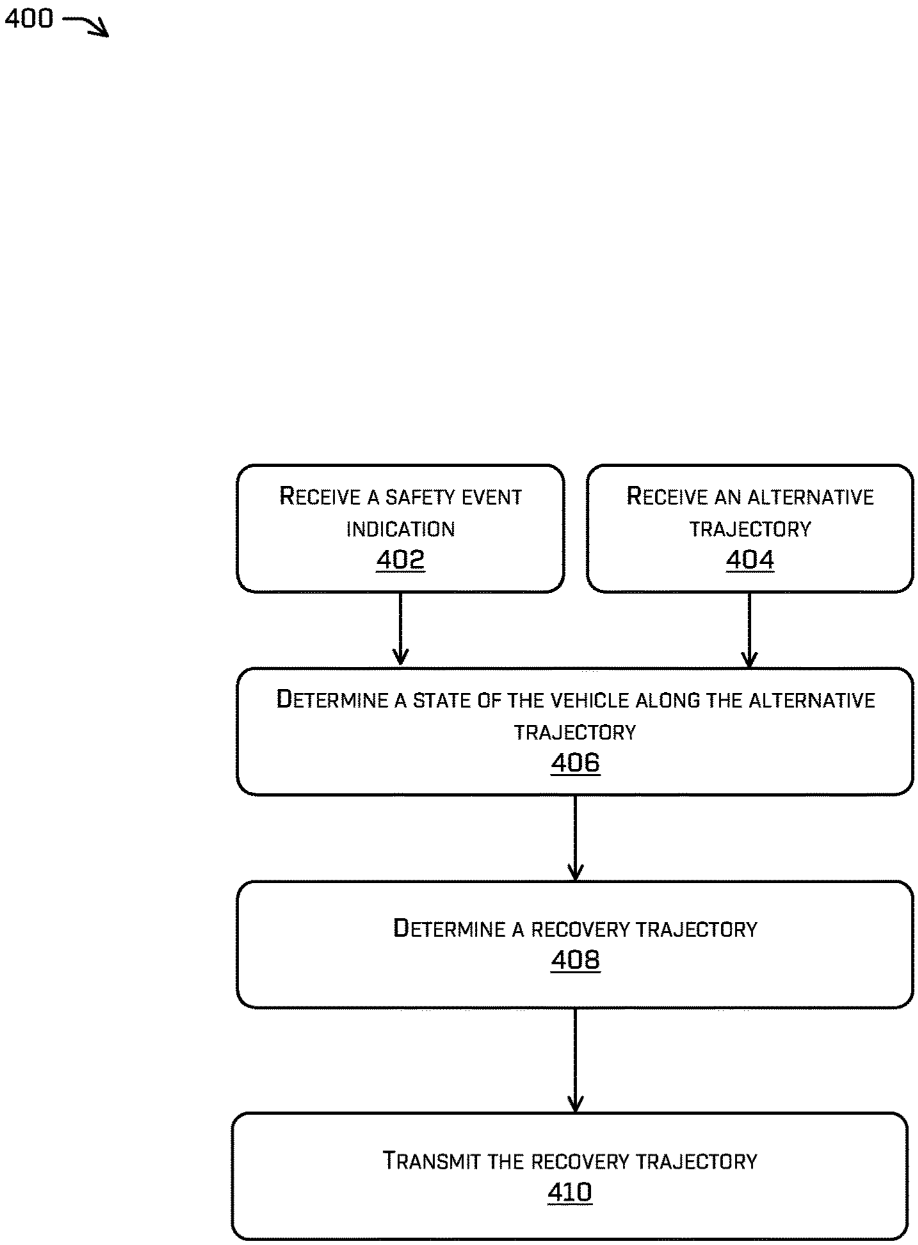
FIG. 4 is a flowchart diagram of an example process for determining and transmitting a recovery trajectory.

FIG. 4 is a flowchart diagram of an example process 400 for determining and transmitting a recovery trajectory. The process 400 may be performed by a planning component during a recovery mode. As depicted in FIG. 4, at operation 402, the process 400 includes receiving a triggering event indication. The triggering event indication may be received from a trajectory planning system of the vehicle. The triggering event indication may represent that the trajectory validation system has determined the presence of a triggering event and/or that the trajectory validation system controls the vehicle based on an alternative trajectory.

At operation 404, the process 400 receives data representing the alternative trajectory. In some cases, data representing the alternative trajectory may be included in the triggering event indication. In some cases, the alternative trajectory may be predefined. For example, configuration data associated with the vehicle may define the alternative trajectory to be a predefined trajectory of immediate stop, a predefined trajectory of slowing down by a predefined magnitude and/or a predefined ratio, a predefined trajectory causing the vehicle to move to the nearest shoulder, and/or the like. In some cases, the alternative trajectory may be determined based on the expected and/or predicted behavior of one or more objects in the vehicle environment.

At operation 406, the process 400 includes determining a state of the vehicle along the alternative trajectory. In some cases, based on (e.g., in response to) receiving the triggering event indication, a component determines the state of the vehicle along the provided alternative trajectory. In some cases, to determine the state of the vehicle along the trajectory, the first component uses at least one of the following: (i) data (e.g., perception data) determined based on sensor data captured by one or more sensors associated with the vehicle, (ii) data determined based on performing one or more predictive inferences regarding expected behavior of one or more objects (e.g., vehicles, pedestrians, and/or the like) in the vehicle environment, and (iii) data representing the behaviors associated with the alternative trajectory. In some cases, the state of the vehicle represents a detected state, a reported state, a predicted state, and/or the like. In some cases, the state data represents at least one a position, a location, a velocity, an acceleration, a direction of movement, and/or the like. In some cases, the state of the vehicle along the trajectory is determined based on at least one of steering data associated with the vehicle and speed data associated with the vehicle. For example, in some cases, if the alternative trajectory is configured to cause the vehicle to immediately come to a halt, the state of the vehicle along the trajectory may be determined based on steering data alone.

At operation 408, the process 400 includes determining a recovery trajectory. In some cases, based on (e.g., in response to) receiving the triggering event indication, a component determines a state of the vehicle along the alternative trajectory and uses the determined state to determine the recovery trajectory. The recovery trajectory may thus be a trajectory determined based on a state of the vehicle along the alternative trajectory.

At operation 410, the process 400 includes transmitting the recovery trajectory to another component (e.g., a trajectory validation component). In some cases, the other component may determine whether to validate the recovery trajectory. In some cases, if the recovery trajectory is validated and a safety condition is no longer present, the other component may control the vehicle based on the recovery trajectory.

Figure 5:
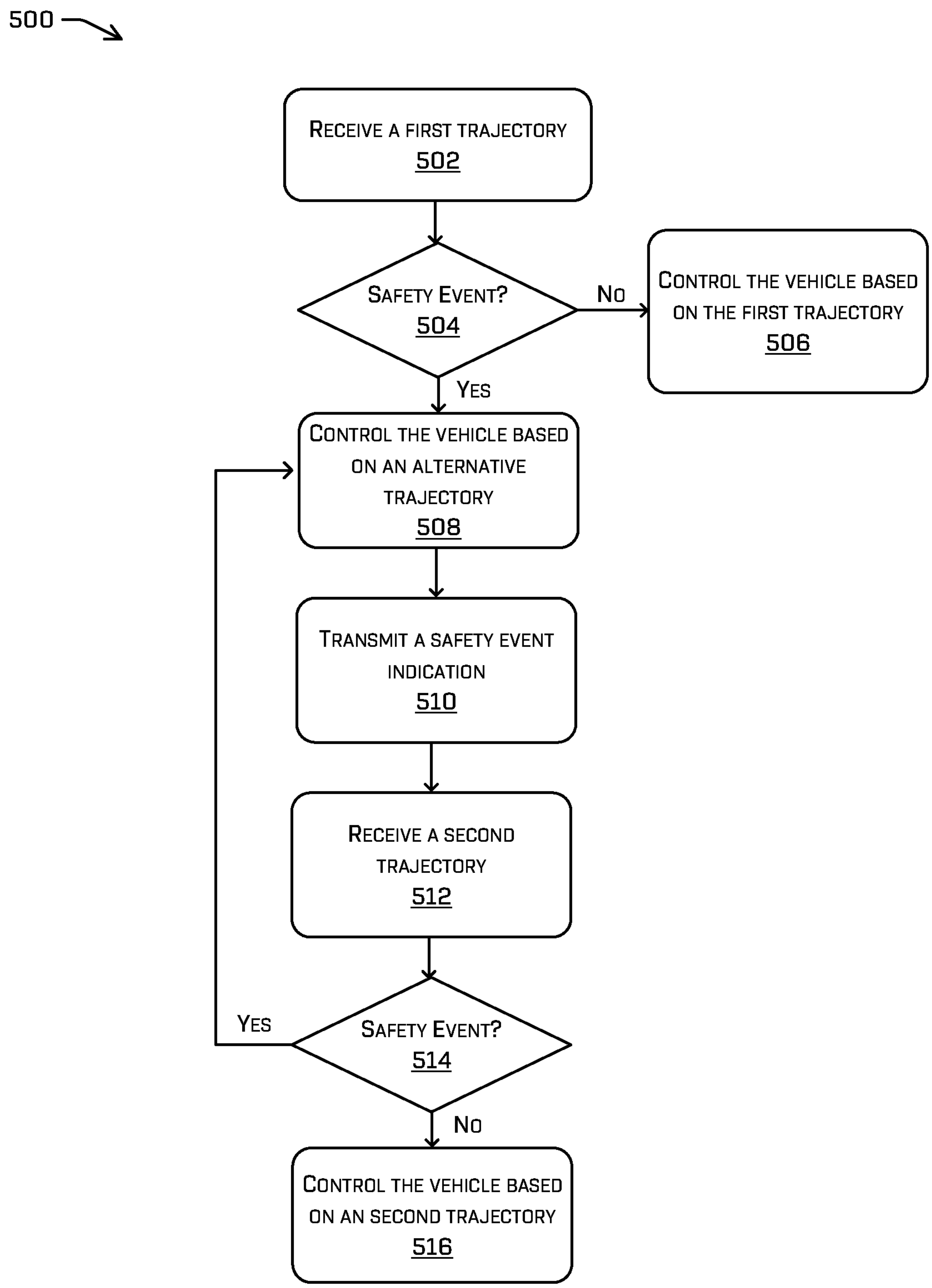
FIG. 5 is a flowchart diagram of an example process for controlling a vehicle.

FIG. 5 is a flowchart diagram of an example process 500 for controlling a vehicle. As depicted in FIG. 5, at operation 502, the process 500 includes receiving a first trajectory. The first trajectory may be determined by a first component (e.g., a planning component). The first component may transmit the first trajectory to a second component (e.g., a trajectory validation component). The first trajectory may be a nominal trajectory. The first trajectory may be configured to cause the vehicle to navigate to an intended destination.

At operation 504, the process 500 includes determining whether to trigger using an alternative trajectory. In some cases, determining whether trigger using the alternative trajectory is determined based on whether a triggering event is present. In some cases, operation 504 is performed by the second component. In some cases, determining the triggering event includes determining the likelihood that the vehicle is unable to proceed safely and determining that the likelihood is more than a threshold. In some cases, the triggering event represents a detected failure of a subsystem associated with the autonomous vehicle, and the absence of the triggering event represents that the subsystem is operating nominally.

At operation 506, based on (e.g., in response to) determining not to trigger using the alternative trajectory at operation 504, the process 500 includes controlling the vehicle based on the first trajectory. In some cases, at operation 506, the vehicle is operating in the nominal mode. In some cases, operation 506 is performed by the second component.

At operation 508, based on (e.g., in response to) determining to trigger using the alternative trajectory at operation 504, the process 500 includes controlling the vehicle based on an alternative trajectory. In some cases, the alternative trajectory is configured to cause the autonomous vehicle to one or more of slow down or stop. In some cases, operation 508 causes the vehicle to transition to a recovery mode. In some cases, operation 508 is performed by the second component.

At operation 510, the process 500 includes transmitting a safety condition indication. In some cases, the second component transmits the safety condition indication to the first component. The triggering event indication may represent that the second component has determined the presence of the triggering event and/or that the second component controls the vehicle based on the alternative trajectory.

At operation 512, the process 500 includes receiving a second trajectory. The second trajectory may be a recovery trajectory. In some cases, the first trajectory is determined by the first component and transmitted to the second component. The second trajectory may be configured to cause the vehicle to navigate to an intended destination. In some cases, the second trajectory is determined based on a state of the vehicle along the alternative trajectory.

At operation 514, the process 400 includes determining whether to stop using the alternative trajectory. In some cases, determining to stop the alternative trajectory is performed based on determining that the triggering event is no longer present and/or determining that the second trajectory is valid. In some cases, determining the presence of triggering event includes determining the likelihood that the vehicle is unable to proceed safely and determining that the likelihood is above a threshold. In some cases, the triggering event represents a detected failure of a subsystem associated with the autonomous vehicle, and the absence of the triggering event represents that the subsystem is operating nominally. In some cases, based on determining to continue using the alternative trajectory at operation 514, the process 500 returns to the operation 508 to continue to control the vehicle based on the alterative trajectory.

At operation 516, based on determining to stop using the alternative trajectory at operation 514, the process 500 includes controlling the vehicle based on the second trajectory. In some cases, controlling the autonomous vehicle in accordance with the second trajectory is based at least in part on determining that a threshold amount of time has passed since the autonomous vehicle was first controlled by the alternate trajectory.

Figure 6:
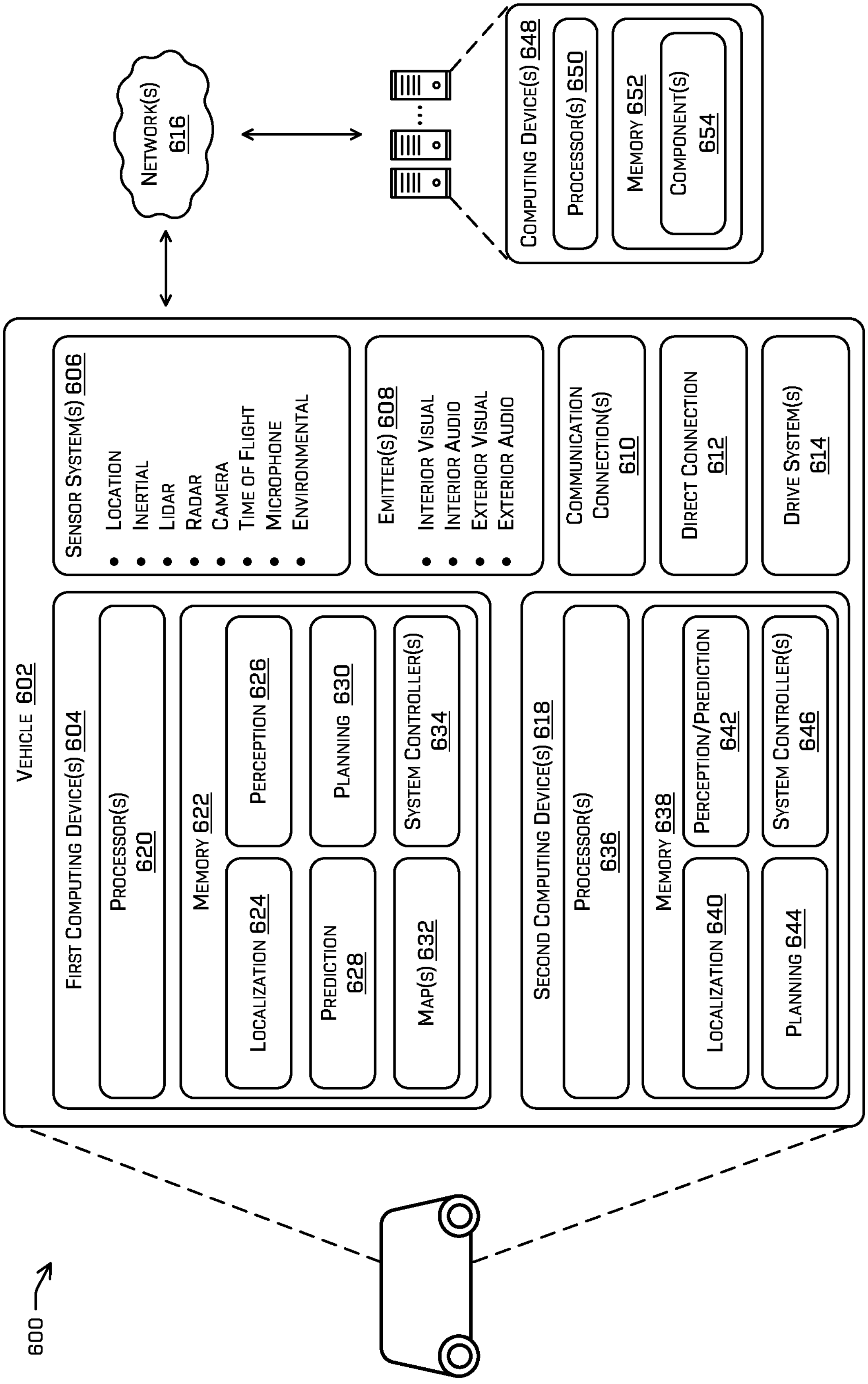
FIG. 6 is a block diagram of an example system for implementing the techniques described herein.

FIG. 6 is a block diagram of an example system 600 for implementing the techniques described herein. In at least one example, the system 600 can include a vehicle 602. In the illustrated example system 600, the vehicle 602 is an autonomous vehicle; however, the vehicle 602 can be any other type of vehicle.

The vehicle 602 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 602 can be configured to control all functions from start to completion of the trip, including all parking functions, it may not include a driver and/or controls for driving the vehicle 602, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 602 can include one or more first computing devices 604, one or more sensor systems 606, one or more emitters 608, one or more communication connections 610 (also referred to as communication devices and/or modems), at least one direct connection 612 (e.g., for physically coupling with the vehicle 602 to exchange data and/or to provide power), and one or more drive systems 614. The one or more sensor systems 606 can be configured to capture sensor data associated with an environment.

The sensor system(s) 606 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 606 can include multiple instances of each of these or other types of sensors. For instance, the time-of-flight sensors can include individual time-of-flight sensors located at the corners, front, back, sides, and/or top of the vehicle 602. As another example, the camera sensors can include multiple cameras disposed at various locations about the exterior and/or interior of the vehicle 602. The sensor system(s) 606 can provide input to the first computing device(s) 604.

The vehicle 602 can also include emitter(s) 608 for emitting light and/or sound. The emitter(s) 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 602 can also include communication connection(s) 610 that enable communication between the vehicle 602 and one or more other local or remote computing device(s) (e.g., a remote teleoperation computing device) or remote services. For instance, the communication connection(s) 610 can facilitate communication with other local computing device(s) on the vehicle 602 and/or the drive system(s) 614. Also, the communication connection(s) 610 can allow the vehicle 602 to communicate with other nearby computing device(s) (e.g., other nearby vehicles, traffic signals, etc.).

The communications connection(s) 610 can include physical and/or logical interfaces for connecting the first computing device(s) 604 to another computing device or one or more external networks 616 (e.g., the Internet). For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 602 can include drive system(s) 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include the sensor system(s) 606 to detect conditions of the drive system(s) 614 and/or the surroundings of the vehicle 602. By way of example and not limitation, the sensor system(s) 606 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 614. In some cases, the sensor system(s) 606 on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor system(s) 606 and to control operation of the various vehicle systems. In some examples, the drive system controller can include one or more processor(s) and memory communicatively coupled with the one or more processor(s). The memory can store one or more components to perform various functionalities of the drive system(s) 614. Furthermore, the drive system(s) 614 also include one or more communication connection(s) that enable communication by the respective drive system with one or more other local or remote computing device(s).

The vehicle 602 can include one or more second computing devices 618 to provide redundancy, error checking, and/or validation of determinations and/or commands determined by the first computing device(s) 604.

By way of example, the first computing device(s) 604 may be considered to be a primary system, while the second computing device(s) 618 may be considered to be a secondary system. The primary system may generally perform processing to control how the vehicle maneuvers within an environment. The primary system may implement various Artificial Intelligence (AI) techniques, such as machine learning, to understand an environment around the vehicle and/or instruct the vehicle to move within the environment. For example, the primary system may implement the AI techniques to localize the vehicle, detect an object around the vehicle, segment sensor data, determine a classification of the object, predict an object track, generate a trajectory for the vehicle, and so on. In examples, the primary system processes data from multiple types of sensors on the vehicle, such as light detection and ranging (lidar) sensors, radar sensors, image sensors, depth sensors (time of flight, structured light, etc.), and the like.

The secondary system may validate an operation of the primary system and may take over control of the vehicle from the primary system when there is a problem with the primary system. The secondary system may implement probabilistic techniques that are based on positioning, velocity, acceleration, etc. of the vehicle and/or objects around the vehicle. For example, the secondary system may implement one or more probabilistic techniques to independently localize the vehicle (e.g., to a local environment), detect an object around the vehicle, segment sensor data, identify a classification of the object, predict an object track, generate a trajectory for the vehicle, and so on. In examples, the secondary system processes data from a few sensors, such as a subset of sensor data that is processed by the primary system. To illustrate, the primary system may process lidar data, radar data, image data, depth data, etc., while the secondary system may process just lidar data and/or radar data (and/or time of flight data). In other examples, however, the secondary system may process sensor data from any number of sensors, such as data from each of the sensors, data from the same number of sensors as the primary system, etc.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference.

The first computing device(s) 604 can include one or more processors 620 and memory 622 communicatively coupled with the one or more processors 620. In the illustrated example, the memory 622 of the first computing device(s) 604 stores a localization component 624, a perception component 626, a prediction component 628, a planning component 630, a maps component 632, and one or more system controllers 634. Though depicted as residing in the memory 622 for illustrative purposes, it is contemplated that the localization component 624, the perception component 626, the prediction component 628, the planning component 630, the maps component 632, and the one or more system controllers 634 can additionally, or alternatively, be accessible to the first computing device(s) 604 (e.g., stored in a different component of vehicle 602 and/or be accessible to the vehicle 602 (e.g., stored remotely).

In memory 622 of the first computing device 604, the localization component 624 can include functionality to receive data from the sensor system(s) 606 to determine a position of the vehicle 602. For example, the localization component 624 can include and/or request/receive a three-dimensional map of an environment (and/or a map based on semantic objects) and can continuously determine a location of the autonomous vehicle within the map. In some instances, the localization component 624 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 624 can provide data to various components of the vehicle 602 to determine an initial position of an autonomous vehicle for generating a trajectory, as discussed herein.

The perception component 626 can include functionality to perform object detection, segmentation, and/or classification. In some examples, the perception component 626 can provide processed sensor data that indicates a presence of an entity that is proximate to the vehicle 602 and/or a classification of the entity as an entity type (e.g., car, pedestrian, cyclist, building, tree, road surface, curb, sidewalk, unknown, etc.). In additional or alternative examples, the perception component 626 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As described above, the perception component 626 can use perception algorithms to determine a perception-based bounding box associated with an object in the environment based on sensor data. For example, the perception component 626 can receive image data and classify the image data to determine that an object is represented in the image data. Then, using detection algorithms, the perception component 626 can generate a two-dimensional bounding box and/or a perception-based three-dimensional bounding box associated with the object. The perception component 626 can further generate a three-dimensional bounding box associated with the object. As discussed above, the three-dimensional bounding box can provide additional information such as a location, orientation, pose, and/or size (e.g., length, width, height, etc.) associated with the object.

The perception component 626 can include functionality to store perception data generated by the perception component 626. In some instances, the perception component 626 can determine a track corresponding to an object that has been classified as an object type. For purposes of illustration only, the perception component 626, using sensor system(s) 606 can capture one or more images of an environment. The sensor system(s) 606 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle 602. Fused perception data can include a fusion or other combination of sensor data from sensor system(s) 606, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 628 can generate one or more probability maps representing prediction probabilities of possible locations of one or more objects in an environment. For example, the prediction component 628 can generate one or more probability maps for vehicles, pedestrians, animals, and the like within a threshold distance from the vehicle 602. In some instances, the prediction component 628 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 630 can determine a path for the vehicle 602 to follow to traverse through an environment. For example, the planning component 630 can determine various routes and paths and various levels of detail. In some instances, the planning component 630 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 630 can generate an instruction for guiding the autonomous vehicle along at least a portion of the route from the first location to the second location. In at least one example, the planning component 630 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 630 can alternatively, or additionally, use data from the perception component 626 and/or the prediction component 628 to determine a path for the vehicle 602 to follow to traverse through an environment. For example, the planning component 630 can receive data from the perception component 626 and/or the prediction component 628 regarding objects associated with an environment. Using this data, the planning component 630 can determine a route to travel from a first location (e.g., a current location) to a second location (e.g., a target location) to avoid objects in an environment. In at least some examples, such a planning component 630 may determine there is no such collision free path and, in turn, provide a path which brings vehicle 602 to a safe stop avoiding all collisions and/or otherwise mitigating damage.

The memory 622 can further include one or more maps 632 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 632 can include at least one map (e.g., images and/or a mesh). In some examples, the vehicle 602 can be controlled based at least in part on the map(s) 632. That is, the map(s) 632 can be used in connection with the localization component 624, the perception component 626, the prediction component 628, and/or the planning component 630 to determine a location of the vehicle 602, identify objects in an environment, generate prediction probabilit (ies) associated with objects and/or the vehicle 602, and/or generate routes and/or trajectories to navigate within an environment.

In some examples, the one or more maps 632 can be stored on a remote computing device(s) (such as the computing device(s) 648) accessible via network(s) 616. In some examples, multiple maps 632 can be stored based on, for example, a characteristic (e.g., type of entity, time of day, day of week, season of the year, etc.). Storing multiple maps 632 can have similar memory requirements but can increase the speed at which data in a map can be accessed.

In at least one example, the first computing device(s) 604 can include one or more system controller(s) 634, which can be configured to control steering, propulsion, braking, safety, emitters, communication, and other systems of the vehicle 602. These system controller(s) 634 can communicate with and/or control corresponding systems of the drive system(s) 614 and/or other components of the vehicle 602, which may be configured to operate in accordance with a path provided from the planning component 630.

The second computing device(s) 618 can comprise one or more processors 636 and memory 638 including components to verify and/or control aspects of the vehicle 602, as discussed herein. In at least one instance, the one or more processors 636 can be similar to the processor(s) 620 and the memory 638 can be similar to the memory 622. However, in some examples, the processor(s) 636 and the memory 638 may comprise different hardware than the processor(s) 620 and the memory 622 for additional redundancy.

In some examples, the memory 638 can comprise a trajectory validation system 118, a localization component 640, a perception/prediction component 642, a planning component 644, and one or more system controllers 646.

In some examples, the localization component 640 may receive sensor data from the sensor(s) 606 to determine one or more of a position and/or orientation (together a pose) of the autonomous vehicle 602. Here, the position and/or orientation may be relative to point(s) and/or object(s) in an environment in which the autonomous vehicle 602 is located. In examples, the orientation may include an indication of a yaw, roll, and/or pitch of the autonomous vehicle 602 relative to a reference plane and/or relative to point(s) and/or object(s). In examples, the localization component 640 may perform less processing than the localization component 624 of the first computing device(s) 604 (e.g., higher-level localization). For instance, the localization component 640 may not determine a pose of the autonomous vehicle 602 relative to a map, but merely determine a pose of the autonomous vehicle 602 relative to objects and/or surfaces that are detected around the autonomous vehicle 602 (e.g., a local position and not a global position). Such a position and/or orientation may be determined, for example, using probabilistic filtering techniques, such as, for example, Bayesian filters (Kalman filters, extended Kalman filters, unscented Kalman filters, etc.) using some or all of the sensor data.

In some examples, the perception component 642 can include functionality to detect, identify, classify, and/or track object(s) represented in sensor data. For example, the perception component 642 can perform the clustering operations and operations to estimate or determine connectivity data associated with data points, as discussed herein.

In some examples, the perception component 642 may comprise an M-estimator, but may lack an object classifier such as, for example, a neural network, decision tree, and/or the like for classifying objects. In additional or alternate examples, the perception component 642 may comprise an ML model of any type, configured to disambiguate classifications of objects. By contrast, the perception component 626 may comprise a pipeline of hardware and/or software components, which may comprise one or more machine-learning models, Bayesian filters (e.g., Kalman filters), graphics processing unit(s) (GPU(s)), and/or the like. In some examples, the perception data determined by the perception component 642 (and/or 626) may comprise object detections (e.g., identifications of sensor data associated with objects in an environment surrounding the autonomous vehicle), object classifications (e.g., identifications of an object type associated with detected objects), object tracks (e.g., historical, current, and/or predicted object position, velocity, acceleration, and/or heading), and/or the like.

The prediction component of the second computing device 618 may also process the input data to determine one or more predicted trajectories for an object. For example, based on a current position of an object and a velocity of the object over a period of a few seconds, the prediction component may predict a path that the object will move over the next few seconds. In some examples, such a predicted path may comprise using linear assumptions of motion given a position, orientation, velocity, and/or orientation. In other examples, such predicted paths may comprise more complex analyses.

In some examples, the planning component 644 can include functionality to receive a trajectory from the planning component 630 to validate that the trajectory is free of collisions and/or is within safety margins. In some examples, the planning component 644 can generate a safe stop trajectory (e.g., a trajectory to stop the vehicle 602 with a "comfortable" deacceleration (e.g., less than maximum deceleration)) and in some examples the planning component 644 can generate an emergency stop trajectory (e.g., maximum deceleration with or without steering inputs).

In some examples, the system controller(s) 646 can include functionality to control safety critical components (e.g., steering, braking, motors, etc.) of the vehicle. In this manner, the second computing device(s) 618 can provide redundancy and/or an additional hardware and software layer for vehicle safety.

The vehicle 602 can connect to computing device(s) 648 via the network 616 and can include one or more processors 650 and memory 652 communicatively coupled with the one or more processors 650. In at least one instance, the one or more processors 650 can be similar to the processor(s) 620 and the memory 652 can be similar to the memory 622. In the illustrated example, the memory 652 of the computing device(s) 648 stores a component(s) 654, which may correspond to any of the components discussed herein.

The processor(s) 620, 636, and/or 650 can be any suitable processor capable of executing instructions to process data and perform operations as described herein. By way of example and not limitation, the processor(s) 620, 636, and/or 650 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 622, 638, and/or 652 are examples of non-transitory computer-readable media. The memory 622, 638, and/or 652 can store an operating system and one or more software applications, instructions, programs, and/or data to implement the methods described herein and the functions attributed to the various systems. In various implementations, the memory 622, 638, and/or 652 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 622, 638, and/or 652 can be implemented as a neural network. In some examples, the components in the memory 622, 638, and/or 652 may not include machine learning algorithm to reduce complexity and to be verified and/or certified from a safety standpoint.

As described herein, an exemplary neural network is an algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)). Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

While the example clauses described below are described with respect to one particular implementation, it should be understood that, in the context of this document, the content of the example clauses can also be implemented via a method, device, system, computer-readable medium, and/or another implementation.

Additionally, any of examples A-T may be implemented alone or in combination with any other one or more of the examples A-T.

A: A system comprising: one or more processors; and one or more non-transitory computer-readable media storing computer-executable instructions that, when executed, cause the one or more processors to perform operations comprising: transmitting, from a first component, a first trajectory for an autonomous vehicle to follow; determining, by a second component, a triggering event; determining, based on determining the triggering event, to control the autonomous vehicle based at least in part on an alternative trajectory configured to cause the autonomous vehicle to one or more of slow down or stop; controlling the autonomous vehicle in accordance with the alternative trajectory; transmitting, to the first component, an indication that the autonomous vehicle is following the alternative trajectory; determining, by the first component and based at least in part on a state of the autonomous vehicle along the alternative trajectory, a second trajectory for the autonomous vehicle to follow; transmitting the second trajectory to the second component; and one of continuing to control the autonomous vehicle based on the alternative trajectory based at least in part on the triggering event being still present or controlling the autonomous vehicle in accordance with the second trajectory based at least in part on an absence of the triggering event.

B: The system of paragraph A, wherein determining the triggering event comprises: determining a likelihood that the autonomous vehicle is unable to proceed safely; and determining that the likelihood is above a threshold.

C: The system of paragraph A or B, wherein: the triggering event represents a detected failure of a subsystem associated with the autonomous vehicle, and the absence of the triggering event represents that the subsystem is operating nominally.

D: The system of any of paragraphs A-C, wherein controlling the autonomous vehicle in accordance with the second trajectory is based at least in part on determining that a threshold amount of time has passed since the autonomous vehicle was first controlled by the alternative trajectory.

E: The system of any of paragraphs A-D, wherein the first trajectory and the second trajectory are configured to cause the autonomous vehicle to navigate to an intended destination.

F: One or more non-transitory computer-readable media storing computer-executable instructions that, when executed, cause one or more processors to perform operations comprising: transmitting, from a first component, a first trajectory for a vehicle to follow; determining, by a second component, a triggering event; determining, based on determining the triggering event, to control the vehicle based at least in part on an alternative trajectory; controlling the vehicle in accordance with the alternative trajectory; determining, by the first component and based at least in part on one or more of a state of the vehicle along the alternative trajectory or a state of the vehicle along the first trajectory, a second trajectory for the vehicle to follow; transmitting the second trajectory to the second component; and one of continuing to control the vehicle based on the alternative trajectory based at least in part on the triggering event being still present or controlling the vehicle in accordance with the second trajectory based at least in part on an absence of the triggering event.

G: The one or more non-transitory computer-readable media of paragraph F, wherein determining the triggering event comprises: determining a likelihood that the vehicle is unable to proceed safely; and determining that the likelihood is above a first threshold.

H: The one or more non-transitory computer-readable media of paragraph F or G, the operations further comprising: determining a likelihood that the vehicle is unable to proceed safely; and one of determining the triggering event based at least in part on the likelihood being above a first threshold or determining the absence of the triggering event based at least in part on the likelihood being less than or equal to a second threshold, wherein the second threshold is lower than the first threshold.

I: The one or more non-transitory computer-readable media of any of paragraphs F-H, wherein: the triggering event represents a detected failure of a subsystem associated with the vehicle, and the absence of the triggering event represents that the subsystem is operating nominally.

J: The one or more non-transitory computer-readable media of any of paragraphs F-I, wherein controlling the vehicle in accordance with the second trajectory is based at least in part on determining that a threshold amount of time has passed since the vehicle was first controlled by the alternative trajectory.

K: The one or more non-transitory computer-readable media of any of paragraphs F-J, the operations further comprising: determining, by the first component, that no indications related to the second trajectory have been received from the second component; determining, by the first component, a third trajectory based at least in part on a second state of the vehicle along the second trajectory; and transmitting, from the first component to the second component, the third trajectory.

L: The one or more non-transitory computer-readable media of any of paragraphs F-K, the operations further comprising: transmitting, from the second component to the first component, a second indication that the vehicle is following the alternative trajectory; determining, by the first component, a third trajectory based at least in part on a second state of the vehicle along the alternative trajectory; and transmitting, from the first component to the second component, the third trajectory.

M: The one or more non-transitory computer-readable media of any of paragraphs F-L, wherein the alternative trajectory is configured to cause the vehicle to one or more of slow down or stop.

N: A method comprising: transmitting, from a first component, a first trajectory for a vehicle to follow; determining, by a second component, a triggering event; determining, based on determining the triggering event, to control the vehicle based at least in part on an alternative trajectory; controlling the vehicle in accordance with the alternative trajectory; determining, by the first component and based at least in part on a state of the vehicle along the alternative trajectory, a second trajectory for the vehicle to follow; transmitting the second trajectory to the second component; and one of continuing to control the vehicle based on the alternative trajectory based at least in part on the triggering event being still present or controlling the vehicle in accordance with the second trajectory based at least in part on an absence of the triggering event.

O: The method of paragraph N, wherein determining the triggering event comprises: determining a likelihood that the vehicle is unable to proceed safely; and determining that the likelihood is above a first threshold.

P: The method of paragraph N or O, further comprising: determining a likelihood that the vehicle is unable to proceed safely; and one of determining the triggering event based at least in part on the likelihood being above a first threshold or determining the absence of the triggering event based at least in part on the likelihood being less than or equal to a second threshold, wherein the second threshold is lower than the first threshold.

Q: The method of any of paragraphs N-P, wherein: the triggering event represents a detected failure of a subsystem associated with the vehicle, and the absence of the triggering event represents that the subsystem is operating nominally.

R: The method of any of paragraphs N-Q, wherein controlling the vehicle in accordance with the second trajectory is based at least in part on determining that a threshold amount of time has passed since the vehicle was first controlled by the alternative trajectory.

S: The method of any of paragraphs N-R, further comprising: determining, by the first component, that no indications related to the second trajectory have been received from the second component; determining, by the first component, a third trajectory based at least in part on a second state of the vehicle along the second trajectory; and transmitting, from the first component to the second component, the third trajectory.

T: The method of any of paragraphs N-S, further comprising: transmitting, from the second component to the first component, a second indication that the vehicle is following the alternative trajectory; determining, by the first component, a third trajectory based at least in part on a second state of the vehicle along the alternative trajectory; and transmitting, from the first component to the second component, the third trajectory.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:

one or more processors; and one or more non-transitory computer-readable media storing computer-executable instructions that, when executed, cause the one or more processors to perform operations comprising:

transmitting, from a first component, a first trajectory for an autonomous vehicle to follow, the first trajectory determined in accordance with a first process associated with a nominal operation of the autonomous vehicle;

determining, by a second component, a first probability associated with a failure of the first trajectory, the failure of the first trajectory being related to a first detection of whether one or more of a sensor or a component associated with the autonomous vehicle fail;

determining, by the second component and based on the first probability exceeding a first threshold, an occurrence of a first triggering event;

determining, based on the occurrence of the first triggering event, to control the autonomous vehicle based at least in part on an alternative trajectory configured to cause the autonomous vehicle to one or more of slow down or stop, the alternative trajectory being determined in accordance with a second process associated with a degraded operation of the autonomous vehicle;

controlling the autonomous vehicle in accordance with the alternative trajectory;

transmitting, to the first component, an indication that the autonomous vehicle is following the alternative trajectory;

determining, by the first component and based at least in part on a state of the autonomous vehicle along the alternative trajectory, a second trajectory for the autonomous vehicle to follow, the second trajectory determined in accordance with the first process;

transmitting the second trajectory to the second component;

determining, by the second component, a second probability associated with a failure of the second trajectory, the failure of the second trajectory being related to a second detection of whether the one or more of the sensor or the component of the autonomous vehicle fail;

determining, by the second component and based on the second probability being less than or equal to a second threshold, whether a second triggering event has occurred, wherein the second threshold is lower than the first threshold, and wherein the second threshold is greater than zero; and one or more of:

controlling the autonomous vehicle in accordance with the alternative trajectory if the second triggering event has not occurred and if the second probability is greater than the second threshold and less than the first threshold above which the autonomous vehicle was previously caused to follow the alternative trajectory; or controlling the autonomous vehicle in accordance with the second trajectory to return to the nominal operation based at least in part on a threshold amount of time having passed since controlling the vehicle in accordance with the alternative trajectory.

2. The system of claim 1, wherein:

the first triggering event represents a detected failure of a subsystem associated with the autonomous vehicle.

3. One or more non-transitory computer-readable media storing computer-executable instructions that, when executed, cause one or more processors to perform operations comprising:

transmitting, from a first component, a first trajectory for a vehicle to follow, the first trajectory determined in accordance with a first process associated with a nominal operation of the vehicle;

determining, by a second component, a first probability associated with a failure of the first trajectory, the failure of the first trajectory being related to a first detection of whether one or more of a sensor or a component associated with the vehicle fail to operate reliably;

determining, by the second component and based on the first probability exceeding a first threshold, an occurrence of a first triggering event;

determining, based on determining the occurrence of the first triggering event, to control the vehicle based at least in part on an alternative trajectory determined in accordance with a second process associated with a degraded operation of the vehicle;

controlling the vehicle in accordance with the alternative trajectory;

determining, by the first component and based at least in part on one or more of a state of the vehicle along the alternative trajectory or a state of the vehicle along the first trajectory, a second trajectory for the vehicle to follow, the second trajectory determined in accordance with the first process;

transmitting the second trajectory to the second component;

determining, by the second component and based on the second probability being less than or equal to a second threshold, whether a second triggering event has occurred, wherein the second threshold is lower than the first threshold, and wherein the second threshold is greater than zero; and one or more of:

controlling the vehicle in accordance with the second trajectory to return to the nominal operation if the first triggering event is absent and the second triggering event has occurred; or controlling the vehicle to continue following the alternative trajectory if the second triggering event has not occurred and if the second probability is greater than the second threshold and less than the first threshold above which the vehicle was previously caused to follow the alternative trajectory.

4. The one or more non-transitory computer-readable media of claim 3, wherein:

the first triggering event represents a detected failure of a subsystem associated with the vehicle.

5. The one or more non-transitory computer-readable media of claim 3, wherein controlling the vehicle in accordance with the second trajectory is further based on determining that a threshold amount of time has passed since the vehicle was first controlled by the alternative trajectory.

6. The one or more non-transitory computer-readable media of claim 3, the operations further comprising:

determining, by the first component, that no indications related to the second trajectory have been received from the second component;

determining, by the first component, a third trajectory based at least in part on a second state of the vehicle along the second trajectory; and transmitting, from the first component to the second component, the third trajectory.

7. The one or more non-transitory computer-readable media of claim 3, the operations further comprising:

transmitting, from the second component to the first component, a second indication that the vehicle is following the alternative trajectory;

determining, by the first component, a third trajectory based at least in part on a second state of the vehicle along the alternative trajectory; and transmitting, from the first component to the second component, the third trajectory.

8. The one or more non-transitory computer-readable media of claim 3, wherein the alternative trajectory is configured to cause the vehicle to one or more of slow down or stop.

9. A method comprising:

transmitting, from a first component, a first trajectory for a vehicle to follow, the first trajectory determined in accordance with a first process associated with a nominal operation of the vehicle;

determining, by a second component, a first probability associated with failure of the first trajectory, the failure of the first trajectory being related to a first detection of whether one or more of a sensor or a component associated with the vehicle fail;

determining, by the second component and based on the first probability exceeding a first threshold, an occurrence of a first triggering event;

determining, based on determining the occurrence of the first triggering event, to control the vehicle based at least in part on an alternative trajectory determined in accordance with a second process associated with a degraded operation of the vehicle;

controlling the vehicle in accordance with the alternative trajectory;

determining, by the first component and based at least in part on one or more of a state of the vehicle along the alternative trajectory or a state of the vehicle along the first trajectory, a second trajectory for the vehicle to follow, the second trajectory determined in accordance with the first process;

transmitting the second trajectory to the second component;

determining, by the second component, a second probability associated with failure of the second trajectory, the failure of the second trajectory being related to a second detection of whether the one or more of the sensor or the component of the vehicle fail;

determining, by the second component and based on the second probability being less than or equal to a second threshold, whether a second triggering event has occurred, wherein the second threshold is lower than the first threshold, and wherein the second threshold is greater than zero; and one or more of:

controlling the vehicle in accordance with the second trajectory to return to the nominal operation if the first triggering event is absent and the second triggering event has occurred; or controlling the vehicle to continue following the alternative trajectory if the second triggering event has not occurred and if the second probability is greater than the second threshold and less than the first threshold above which the vehicle was previously caused to follow the alternative trajectory.

10. The method of claim 9, wherein:

the first triggering event represents a detected failure of a subsystem associated with the vehicle.

11. The method of claim 9, wherein controlling the vehicle in accordance with the second trajectory is further based on determining that a threshold amount of time has passed since the vehicle was first controlled by the alternative trajectory.

12. The method of claim 9, further comprising:

determining, by the first component, that no indications related to the second trajectory have been received from the second component;

determining, by the first component, a third trajectory based at least in part on a second state of the vehicle along the second trajectory; and transmitting, from the first component to the second component, the third trajectory.

13. The method of claim 9, further comprising:

transmitting, from the second component to the first component, a second indication that the vehicle is following the alternative trajectory;

determining, by the first component, a third trajectory based at least in part on a second state of the vehicle along the alternative trajectory; and transmitting, from the first component to the second component, the third trajectory.

* * * * *